Nov. 8, 1960 R. P. HEUER 2,959,406
OPEN HEARTH FURNACE REGENERATOR
Filed Aug. 1, 1955 4 Sheets-Sheet 1

INVENTOR
Russell P. Heuer
BY
ATTORNEYS.

Nov. 8, 1960 R. P. HEUER 2,959,406
OPEN HEARTH FURNACE REGENERATOR
Filed Aug. 1, 1955 4 Sheets-Sheet 2
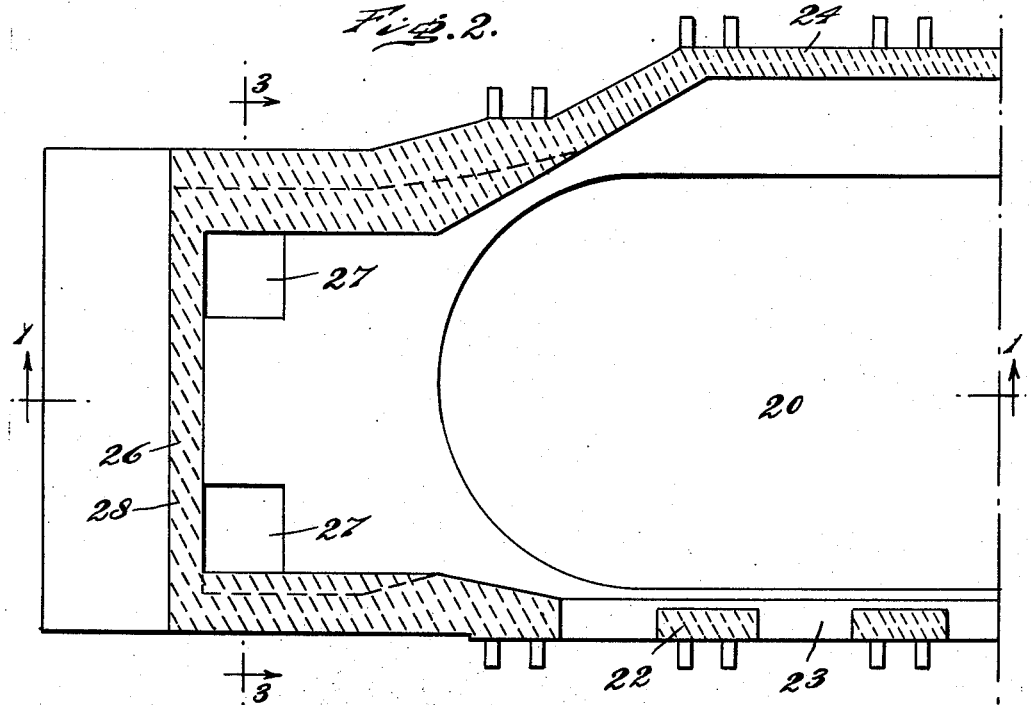
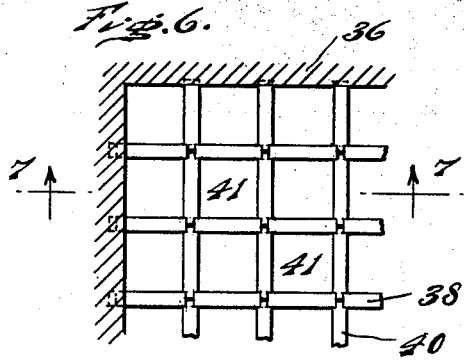
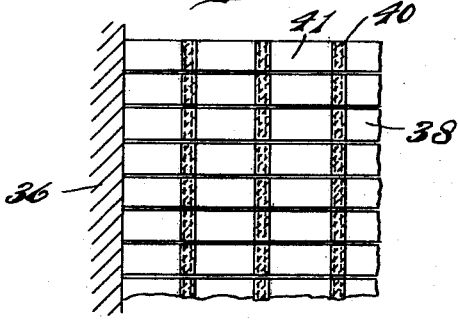
INVENTOR
Russell P. Heuer
BY
ATTORNEYS.

Nov. 8, 1960 R. P. HEUER 2,959,406
OPEN HEARTH FURNACE REGENERATOR
Filed Aug. 1, 1955 4 Sheets-Sheet 3

INVENTOR
Russell P. Heuer
BY
ATTORNEYS.

Nov. 8, 1960 R. P. HEUER 2,959,406
OPEN HEARTH FURNACE REGENERATOR
Filed Aug. 1, 1955 4 Sheets-Sheet 4
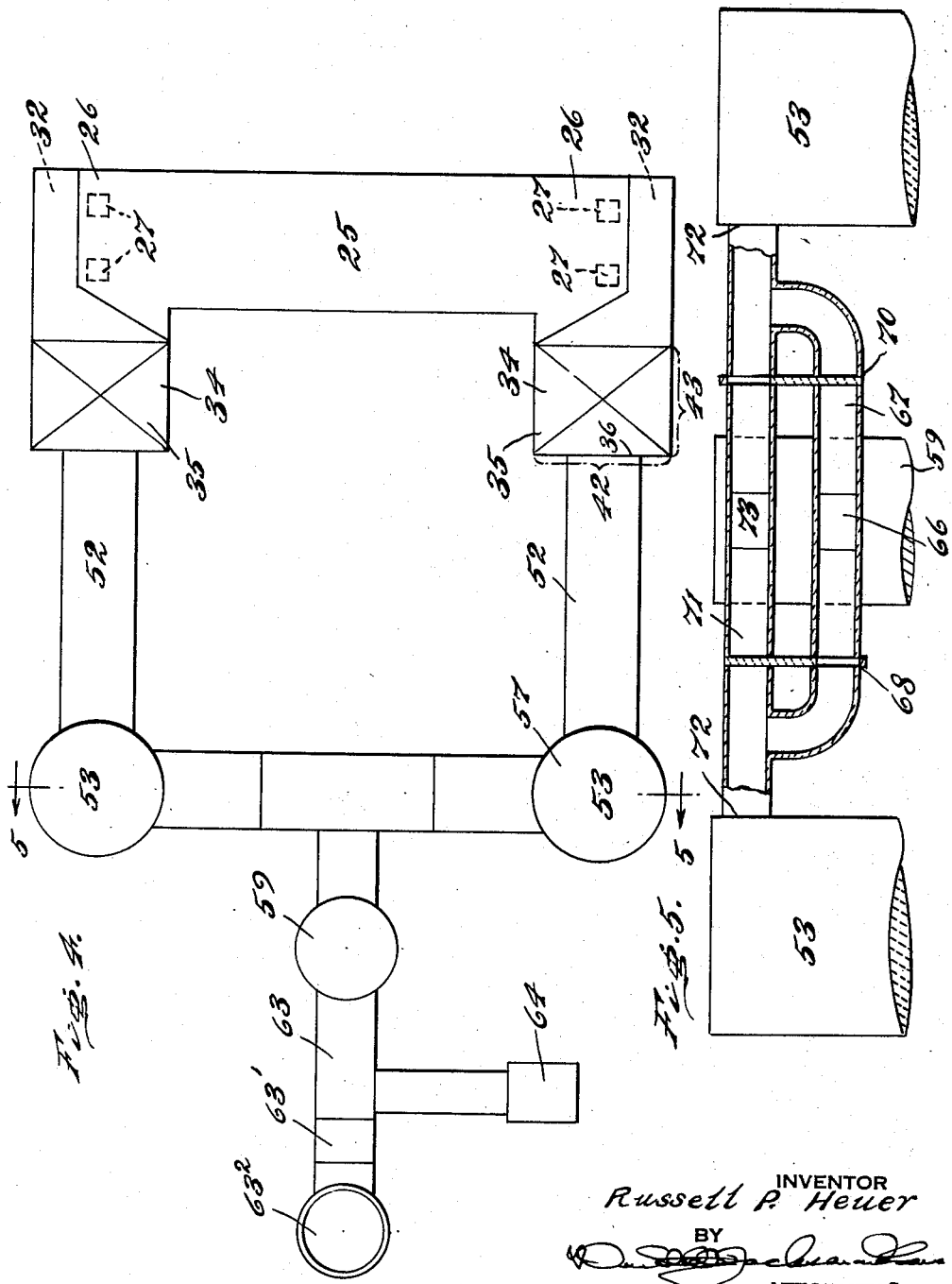
INVENTOR
Russell P. Heuer
BY
ATTORNEYS.

_United States Patent Office_

2,959,406
Patented Nov. 8, 1960

2,959,406

OPEN HEARTH FURNACE REGENERATOR

Russell Pearce Heuer, Bryn Mawr, Pa., assignor to General Refractories Company, a corporation of Pennsylvania Filed Aug. 1, 1955, Ser. No. 525,618

2 Claims. (Cl. 263—15)

The present invention relates to an open hearth steel melting furnace, particularly of the type in which the refractory of the furnace construction itself is entirely basic.

A purpose of the invention is to produce a heat recovery system for an open hearth steel melting furnace which increases the furnace operating temperature economically.

A further purpose is to provide an all-basic open hearth steel melting furnace with a heat recovery system which is capable of preheating the combustion air in the furnace burner when measured by an aspirator pyrometer during the refining period to an average temperature of 2400° F. above the ambient temperature of the air.

A further purpose is to subdivide the heat recovery system for an open hearth furnace into two parts, a smaller and hotter part having a non-acid refractory roof and containing non-acid checker brick located near to the furnace in the path of exit gas flow and preferably below the furnace, and a larger and cooler part lined with acid refractory and containing acid refractory checker brick having a height substantially greater than the height of the checker brick in the hotter part and located at some distance from the furnace in the path of exit gas flow and permissibly extending partially above the hotter part, there being a longitudinal connecting flue between the two parts.

A further purpose is to carry the exit gases from the acid checker chamber through a suitably metallic recuperator which is capable of cooling the waste gases to a temperature below 500° F.

A further purpose is to build the non-acid checkers with continuous vertical flues, arranged in parallel.

A further purpose is to employ in the non-acid checkers brick predominently consisting of magnesia with a suitable bonding substance and desirably with a minor content of chrome ore.

A further purpose is to utilize as a non-acid checker brick magnesium silicate having a mol ratio of magnesium oxide to silica of about 2 to 1, along with a bonding substance.

A further purpose is to utilize as a non-acid checker brick chrome ore suitably with magnesia as the chief minor constituent and with a suitable bonding substance.

A further purpose is to provide an all-basic open hearth furnace with relatively small exit flues in order to maintain a high temperature in the exit gases and to operate the high temperature regenerator at the highest practical temperature, the flue area being not in excess of 0.050 times the area of the melting hearth of the furnace measured at the foreplate level of the furnace.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a section on the line 1—1 of Figure 2.

Figure 2 is a fragmentary plan section of one end of an open hearth furnace according to the invention, the section being taken on the line 2—2 of Figure 1.

Figure 4 is a fragmentary diagrammatic top plan view of the structure of Figure 3.

Figure 5 is a diagrammatic fragmentary enlarged section through the flues of Figure 4, on the line 5—5.

Figure 6 is a fragmentary horizontal section through the checker brick of the high temperature chamber shown to enlarged scale.

Figure 7 is a diagrammatic fragmentary vertical section of the structure of Figure 6, the section being taken on the line 7—7.

Figure 1:
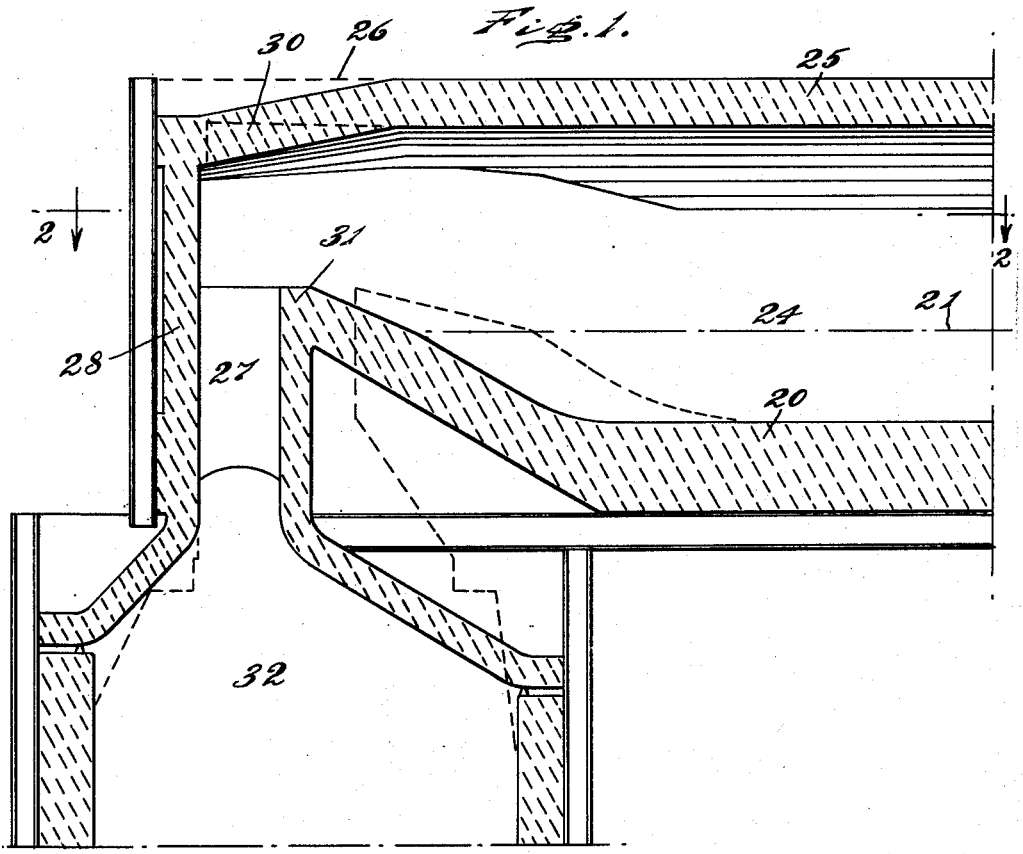
Figure 1 is a central vertical section of half of an open hearth steel melting furnace according to the invention, the opposite half being an opposite counterpart.
Figure 3:
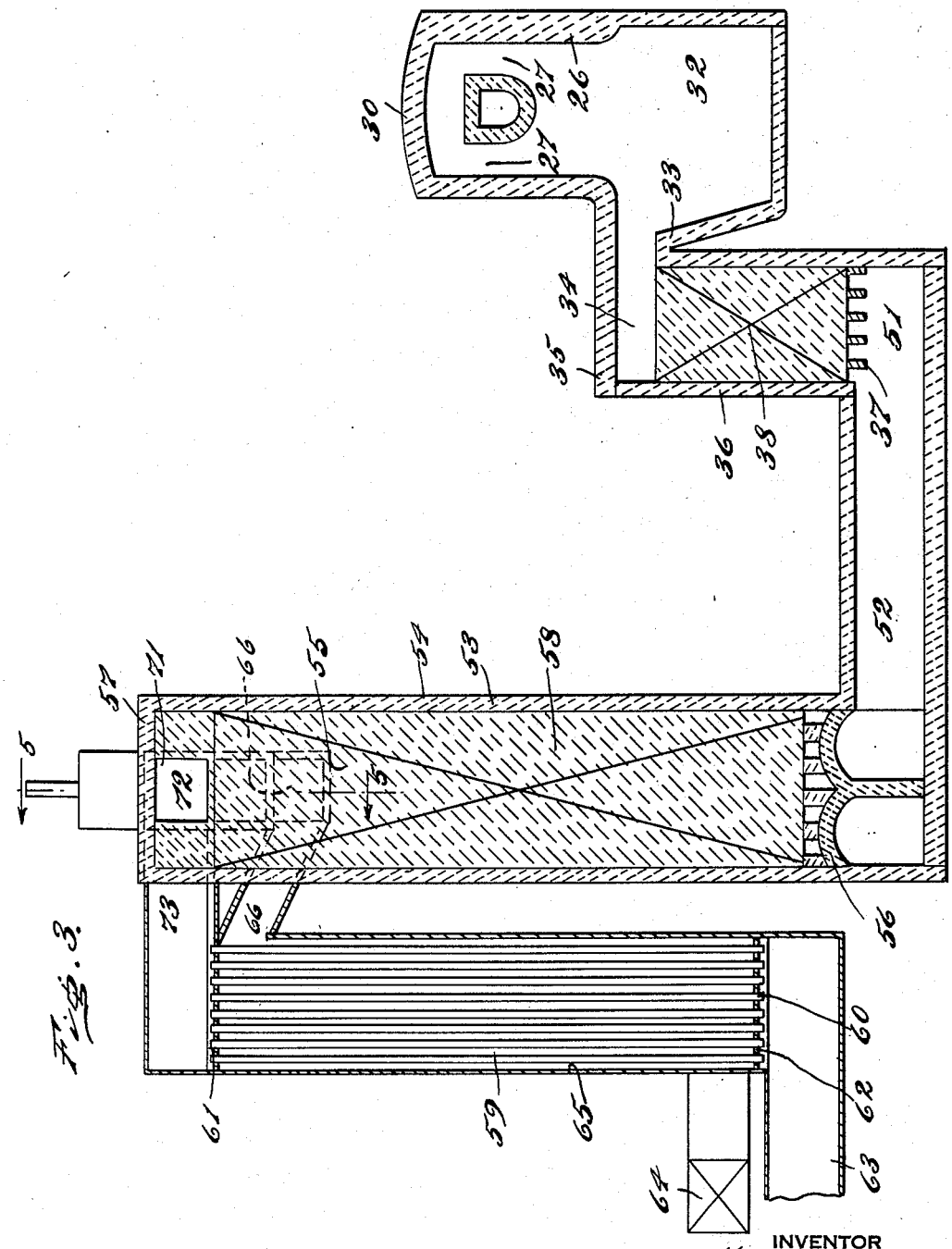
Figure 3 is a diagrammatic vertical section of one end of the open hearth furnace and the heat recovery system of the invention, the section being taken on the line 3—3 of Figure 2.

Heat recovery systems in open hearth steel furnaces usually consist of a checker system of refractory brick and flues through which the exit gases from the furnace are led on their way to the furnace stack.

The flow of gases through the furnace is reversed at short intervals of say 15 minutes, the exit gases being led alternately from opposite ends of the furnace through flues and regenerators which as well known are located symmetrically at the opposite ends of the furnace. The preheated combustion air is simultaneously introduced into the furnace from the opposite end with respect to the end through which the exit gases are passing to the regenerator so as to maintain a flow through the furnace first in one direction and then in the opposite direction. The fuel for heating the furnace is introduced alternately into the opposite ends of the furnace, the fuel always being introduced at the end at which the combustion air is introduced. Any one of a wide variety of liquid or gaseous fuels may be used, such as fuel oil, tar, natural gas, coke oven gas, or some combination.

The exit gases which leave the regenerator system in the prior art practice usually have a temperature exceeding 800° F. and it is common practice to pass such gases to a waste heat boiler, thereby recovering additional heat, although the heat recovery is not available for use in the furnace itself.

The rate of production obtainable in an open hearth furnace is dependent at least in part upon the radiating temperature of the fuel flame and the distribution and quality of the radiating flame. In prior art practice it was necessary to construct the furnace roof of silica refractory and the roof temperature was limited by the fusion point of the silica brick. In recent years, however, it has been possible to obtain basic or non-acid refractory in a form which can be used for the roof of an open hearth furnace, thus greatly increasing the fusion point of the roof. Such roof brick consist of magnesia and/or chromite.

Unfortunately, however, I find that it has not been possible to utilize the full improvements in furnace operation made possible by the increased fusion point of the roof because the regenerative system of the prior art type does not permit realization of maximum air temperatures. Higher temperatures and higher production have been obtained in all-basic open hearth furnaces, but the amount of fuel utilized has been excessive and the increase in production to be expected from increased fuel consumption was not attained.

I have discovered that this difficulty has arisen because of poor regeneration, and that improved regeneration will correct this problem.

From a study of prior silica roof open hearth furnaces it is apparent that the regenerative system was designed to recover in the preheated combustion air a large number of thermal units but the temperature at which the combustion air was reintroduced into the furnace was low. When such regenerative systems have been used in the past on basic roofed open hearth furnaces it has been necessary to obtain higher production rates by greatly increasing fuel input. There was a tendency to increase the temperature of the exit gases from the furnace but the prior art regenerative systems have not been able to utilize such hotter gases to increase the preheating temperature of the combustion gases.

One of the principal reasons for the difficulty is that the acid checker refractories, consisting for example of fireclay, which have been used throughout the flues and the refractory system of the regenerator are very vulnerable to attack by basic flue dust carried by the exit gases when the exit gas temperature is slightly increased. To overcome this difficulty, large uptakes and large regenerative chambers have been used so that the regeneration in the prior art has taken place at lower temperature. It has then been possible to use acid refractories in the heat recovery system and recover substantial amounts of heat at reduced temperatures. This has, however, sacrificed the most valuable heat, namely that available at very high temperatures.

I have discovered that it is possible to recover the waste heat and make it available at high temperature. To accomplish this purpose the regeneration is carried out in two separate heat recovery units. The first one which employs basic refractories operates at high temperature and receives the exit gas when it first leaves the furnace, while the second one uses acid refractories and operates at lower temperature. The use of basic refractory brick in the high temperature regenerator avoids destructive attack of basic flue dust in the acid gases, and also permits higher operating temperature since the fusion temperature is higher. Also, in order to obtain a high operating temperature in the first regenerator, the size of the uptakes is restricted as later explained, and the total weight of the regenerative brick in the basic regenerator is restricted.

After the exit gases leave the basic unit, their temperature may still be as high as 2200° F. as determined by an aspirating pyrometer inserted in the moving gases, and in any case above 2000° F. It is decidedly preferable to keep the temperature of the refractories in the acid regenerative unit below 2300° F. so as to avoid difficulty with fusion of acid refractories.

In accordance with the invention, the open hearth steel melting furnace comprises a basic refractory hearth 20 having a foreplate level 21, having a front wall 22 provided with door openings 23, a back wall 24 and a roof 25. All the refractory portions are of basic or non-acid refractories. The furnace has basic refractory ends 26, only one of which is shown. It is preferable to use a furnace of the so-called Maerz type having double uptakes 27, 27 at the corners of the end adjoining the basic refractory end wall 28. The port roof 30 also of basic refractory slopes down toward the end as shown, suitably at an angle of about 10° to the horizontal in the preferred embodiment. Thus the port roof is higher at a position above the bridge wall 31 than it is at the end wall.

The roof, walls and ends are desirably composed of magnesia and/or chromite refractory brick capable of withstanding a temperature of 3150° F. or higher. The uptakes 27 lead vertically downward to a slag pocket 32, also of basic or non-acid refractory, and then the exit gases pass over a regenerator bridge wall 33 of non-acid refractory into a high temperature regenerator 34.

The total uptake horizontal cross-sectional flue area of the uptake 27 is restricted to a maximum of 0.050 times the area of the melting hearth measured at the foreplate level. This tends to increase the temperature of the exit gases. In practice the slag pocket should be of sufficient volume to accumulate deposits which may occur at this point during the furnace campaign, but excess slag pocket capacity is not recommended.

The entire refractory structure of the uptakes and the slag pocket closure is preferably made of basic refractory supported construction.

The high temperature regenerator is enclosed in a refractory structure consisting of a basic suspended refractory roof 35, basic or non-acid lateral walls 36, and a basic refractory grill or understructure 37 at the bottom. The checker brick in the high temperature regenerator consists of basic or non-acid refractory 38.

The checker brick will desirably be magnesia with a bonding substance such as one percent to two percent by weight of sulphuric acid. If desired, a minor content such as 5 to 35 percent by weight of chrome ore may be included. Another very desirable basic or non-acid checker brick is magnesium silicate with one to five percent of kaolin or other suitable clay as a bonding substance. Magnesium silicate should have a mol ratio of magnesium oxide to silica of about 2 to 1. Another non-acid checker brick which may be used consists of chrome ore with one to five percent of a suitable clay as a bonding substance. A minor amount, suitably 10 to 35 percent magnesia may be included if desired. The non-acid checker brick preferably are used unburned, although it may be burned if desired. The non-acid checker brick as shown in Figures 5 and 6 are suitably in vertical columns 40 with parallel flues 41 extending vertically between the columns of brick.

The exit gases desirably enter at the top of the high temperature regenerator 34 and extend downward through the vertical passages on their way to the stack. The temperature of the exit gases as they pass over the regenerator bridge wall 33 and enter the high temperature regenerator will desirably exceed 2600° F. As the exit gases pass through the vertical passages 41 of the high temperature regenerator 34, it is desirable that the amount of heat absorbed by the checker brick shall be limited so that the exit gases from the high temperature regenerator which leave at 51 will at some time during the checker cycle reach about 2200° F. For this purpose the mass of checker brick in the high temperature regenerator is less than ⅓ of the total mass of checker brick in one high temperature and one low temperature regenerator.

A typical quantity of checker brick in the high temperature regenerator might be 25 to 30 percent of the total checker brick in one high temperature regenerator and one low temperature regenerator.

The thickness of the checker brick in the high temperature regenerator and the sizes of the flue openings may be fixed by standard methods. It is preferable that the checker setting be as deep as possible and with this in view the horizontal area covered by the checker brick plus the enclosed flue openings should be less than the square of the depth of the checker setting in the high temperature regenerator. It is also desirable that the width 42 of the checker setting exceed the length 43 because the shorter length overcomes the tendency of the exit gases to traverse the flues adjoining the most remote wall (opposite to the wall adjoining the regenerator bridge wall 33) of the checker chamber and overcomes the tendency of the combustion air on the reverse of the cycle to traverse the flues adjoining the opposite wall. Therefore, the structure in which the width exceeds the length produces a higher preheat temperature.

The exit gases from the basic or non-acid regenerator enter a suitable refractory flue 52 which suitably extends horizontally and connects with the bottom of acid refractory regenerator 53 consisting of acid refractory lateral walls 54 surrounding a chamber 55, an acid refractory grill supporting structure 56 at the bottom, and acid refractory roof 57 at the top and acid refractory checker brick 58 formed with suitably vertical parallel flues as already described. The acid refractory brick are suitably of fireclay. The acid refractory regenerator 53 permits the exit gases to pass upward through the checker flues to the exit stack. The size of the checker brick and the flues conform to conventional practice. The mass of the acid checker brick 58 should exceed ⅔ of the total checker brick in the system consisting of one high temperature and one low temperature regenerator, and will in any case be more than one-half.

In prior art practice it has been customary to recover the final heat content of the waste gases by a waste heat boiler. In the system of the present invention it is not desirable to discard the heat contained in the conventional regenerator exit gases to a waste heat boiler, since this will interfere with obtaining the highest preheat temperature for the combustion air. Thus, even if a basic regenerator is used capable of withstanding higher temperature, full benefit will not be obtained unless sufficient air preheat is secured to create such higher temperatures.

To illustrate this point, if we assume that the average temperature of the gas coming into the heat recovery system is 2900° F. and the exit gas temperature from the second regenerator unit is about 700° F., the heat given up in the system is determined by the weight of gas passing through the system, the specific heat and the temperature drop of 2200° F. If we assume that there is no combustion in the regenerator, the heat available for the incoming air is slightly less than the heat released by the exit gases by the amount of fuel and air infiltration. As an approximation, however, it is safe to say that for a temperature drop of 2200° F. in the outgoing gases passing through the heat recovery system, it is not possible to obtain a rise in temperature greatly exceeding 2200° F. in the incoming gases passing through the system. It therefore, becomes evident that in order to obtain my objective of a combustion air temperature in excess of 2300° F. the temperature drop in the heat recovery system must exceed 2200° F. This requires that the exit gas temperature must average below 700° F. To obtain this result the exit gases from the basic regenerator pass through a tall acid regenerator 53. If desired, the height of the regenerator 53 can be reduced by adding a metallic or refractory recuperator at the cold end of the system.

To illustrate this, a metallic recuperator 59 is shown having vertical steel tubes 60 through which the exit gases pass, connected in openings in tube sheets 61 and 62 at the opposite ends. The exit gas passing through the tubes in the recuperator is carried through a flue 63 to a blower 63' and then to the stack 63². The incoming air passes through blower 64 and then through the space 65 around the tubes of the recuperator, and finally out through the flue 66 which connects with a horizontal cross flue 67, which communicates with valves 68 and 70 at opposite ends, and then joins beyond the valves a horizontal flue 71 which itself passes through opposite passages of the valves 68 and 70. The flue 71 communicates at the two ends with the top of the regenerator 53 at 72 and communicates at 73 with the top of the recuperator. The valves 68 and 70 as shown are always set oppositely, so that flue 67 is open to one regenerator to introduce air and closed to the other regenerator, and flue 71 is open to the other regenerator to receive exit gases, and closed to the first regenerator. The two valves 68 and 70 are thrown alternately in opposite direction as the cycle is reversed.

Whether or not the recuperator is used, the combustion air passes downwardly through the acid regenerator 53 and enters the upward passages through the basic regenerator 36 at a temperature which should exceed 1600° F. in normal operation. The preheated air passes over the regenerator bridge wall 33 from the basic regenerator at a temperature which should exceed 2000° F. in normal operation and after passing through the uptakes 27 the temperature should exceed 2300° F. in normal operation. The prior art practice will give a temperature in preheated air that is somewhat less than 2100° F.

For an increase of each 100° F. in temperature of the preheated air the time of producing the furnace heat may be reduced as much as 5 percent, with a corresponding saving in fuel.

Furthermore, with higher combustion air preheat a better transfer of heat to the furnace charge results and higher fuel input is possible, so that the production of an all-basic furnace will increase as much as 25 percent or more above the production of the same furnace using a silica roof.

The exit gases from such a sharp working furnace will exceed the temperatures normally prevailing with a silica roof but by restricting the furnace uptakes as already explained and using a small high temperature basic regenerator as previously mentioned it is possible for me to obtain still higher preheat for the combustion air with corresponding advantages in furnace production and fuel economy. By using a large vertical regenerator with acid lining supplemented by an efficient recuperator it is possible to obtain a larger drop in the temperature of the exist gases as they pass through the system and therefore this desirable preheat can be returned to the combustion air.

When reference is made herein to air and flue gas temperatures it is meant to indicate temperatures generally prevailing during the refining period of the furnace heat. All such temperatures are obtained with aspirating pyrometers.

The reference to percentages in respect to the composition of refractories is in each case by weight.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In an open hearth furnace, a reversible heat recovery system in which the exit gases and combustion air are alternately led through a system of checker brick, comprising a high temperature checker chamber relatively adjacent to the open hearth furnace in the path of exit gas flow having a roof of nonacid refractory brick, an entrance for said exit gas on one side of the chamber and an exit for said exit gas at a different level on the opposite side of the chamber and vertical flues of nonacid refractory brick in between, the horizontal distance across the chamber in the direction between said entrance and exit being less than the horizontal distance across the chamber perpendicular to said direction, a low temperature chamber located more remote from the open hearth furnace in the path of exit gas flow having an acid refractory brick lining and containing acid checker brick, there being a series of continuous vertical flues through the low temperature checker chamber, the low temperature checker chamber being relatively higher than the high temperature checker chamber and the mass of checker brick in the low temperature checker chamber being substantially greater than that in the high temperature checker chamber, a flue connecting the high temperature checker chamber and the low temperature checker chamber, and a recuperator having a first air passage means connected to receive the exit gases after they have passed through the low temperature checker chamber and a second air passage means in heat transfer relation with but closed off from the first, connected to receive air for combustion and pass it into a low temperature checker chamber not then in communication with the exit gas.

2. In an open hearth furnace, a reversible heat recovery system in which the exit gases and combustible air are alternately led through a system of checker brick, comprising a high temperature checker chamber having upper and lower ends and being relatively adjacent to the open hearth furnace in the path of exit gas flow having a roof of non-acid refractory brick and having non-acid checker brick forming vertical flues, an entrance for said exit gas on one side of the chamber and an exit for said exit gas at a different level on the opposite side of the chamber, the horizontal distance across the chamber in the direction between said entrance and exit being less than the horizontal distance across the chamber perpendicular to said direction, a low temperature chamber having upper and lower ends and being separate from the high temperature chamber and located more remote from the open hearth furnace in the path of exit gas flow, having an acid refractory brick lining and containing acid checker brick, there being a series of continuous vertical flues through the low temperature checker chamber, the low temperature checker chamber being relatively higher at the upper end than the upper end of the high temperature checker chamber and the mass of checker brick in the low temperature checker chamber being substantially greater than that in the high temperature checker chamber, and a flue connecting the lower ends of the high temperature checker chamber and the low temperature checker chamber.

References Cited in the file of this patent

UNITED STATES PATENTS

| | | |
|---|---|---|
| 1,905,677 | Billiar | Apr. 25, 1933 |
| 1,924,936 | Lehr | Aug. 29, 1933 |
| 2,537,013 | Austin | Jan. 9, 1951 |
| 2,571,102 | Austin | Oct. 16, 1951 |
| 2,647,062 | Lathe | July 28, 1953 |
| 2,771,285 | Heuer | Nov. 20, 1956 |

FOREIGN PATENTS

"Special Refractories for Checker Brick," by C. C. Benton, in pages 109–113, inclusive, volume 38 of the 1955 A.I.M.E.

Open Hearth Proceedings, reporting the sessions of April 18, 1955; page 99 of volume 38.